(12) United States Patent
Inoguchi et al.

(10) Patent No.: US 7,308,838 B2
(45) Date of Patent: Dec. 18, 2007

(54) SHIFT LEVER LOCK DEVICE FOR VEHICULAR AUTOMATIC TRANSMISSION

(75) Inventors: Tetsunori Inoguchi, Shizuoka-ken (JP); Masanori Suzuki, Shizuoka-ken (JP)

(73) Assignee: Hamanako Denso Co., Ltd., Kosai-shi (JP)

( * ) Notice: Subject to any disclaimer, the term of this patent is extended or adjusted under 35 U.S.C. 154(b) by 0 days.

(21) Appl. No.: 11/590,871

(22) Filed: Nov. 1, 2006

(65) Prior Publication Data
US 2007/0068305 A1   Mar. 29, 2007

Related U.S. Application Data

(62) Division of application No. 11/210,107, filed on Aug. 24, 2005, now Pat. No. 7,213,483.

(30) Foreign Application Priority Data
Sep. 21, 2004   (JP) ............... 2004-273145

(51) Int. Cl.
*B60K 20/00*    (2006.01)
*G05G 5/00*     (2006.01)
(52) U.S. Cl. .............. 74/473.23; 74/473.21; 74/473.24; 74/473.25
(58) Field of Classification Search .......... 74/473.21, 74/473.23, 473.24, 473.25; 192/220.4, 220.5
See application file for complete search history.

(56) References Cited

U.S. PATENT DOCUMENTS 4,346,319 A * 8/1982 Naganuma ............ 310/36
6,336,373 B1 * 1/2002 Murai et al. ........... 74/473.23
6,789,444 B2 * 9/2004 Fujiwara et al. ......... 74/473.23
7,213,483 B2 * 5/2007 Inoguchi et al. ......... 74/473.23

FOREIGN PATENT DOCUMENTS

JP   2002-362179   12/2002
JP   2005-145435 A   6/2005

* cited by examiner

*Primary Examiner*—Richard Ridley
*Assistant Examiner*—Terence Boes
(74) *Attorney, Agent, or Firm*—Morgan, Lewis & Bockius LLP

(57) ABSTRACT

In association with a solenoidal coil 10 being energized to unlock a shift lever 1C, a first movable core 9 and a second movable core 11 magnetically stick together so as to rotationally move in unison from an original position in which the first movable core 9 engages with the second movable core 11. Because the first movable core 9 and the second movable core 11 stick together before unlocking the shift lever 1C, it is possible to avoid the first movable core 9 from hitting the second movable core 11 so as to eliminate an operational noise. A lock plate 7 and a link plate 8 are rotatably provided around a rotational center 6 in relative to the solenoidal coal 10. This prevents the lock plate 7 and the link plate 8 from moving rotationally in unison with the solenoidal coil 10 so as to insure a smooth and quick rotational movement.

6 Claims, 8 Drawing Sheets

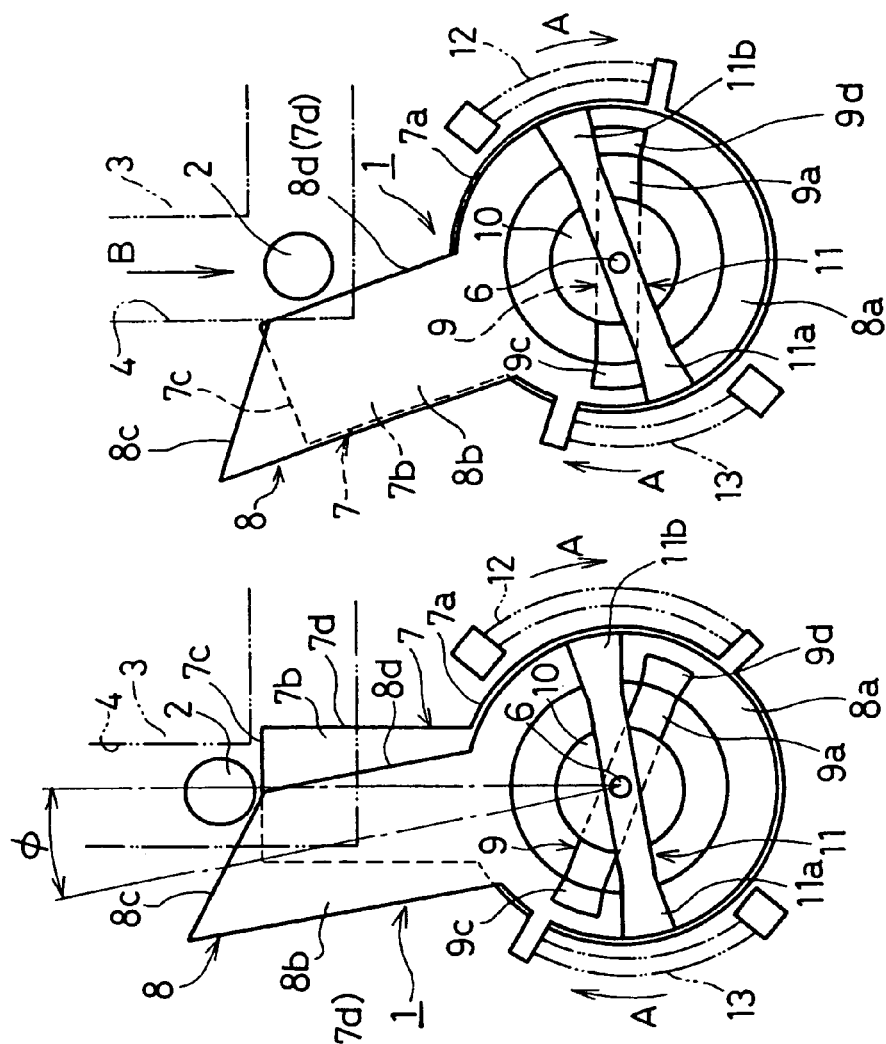

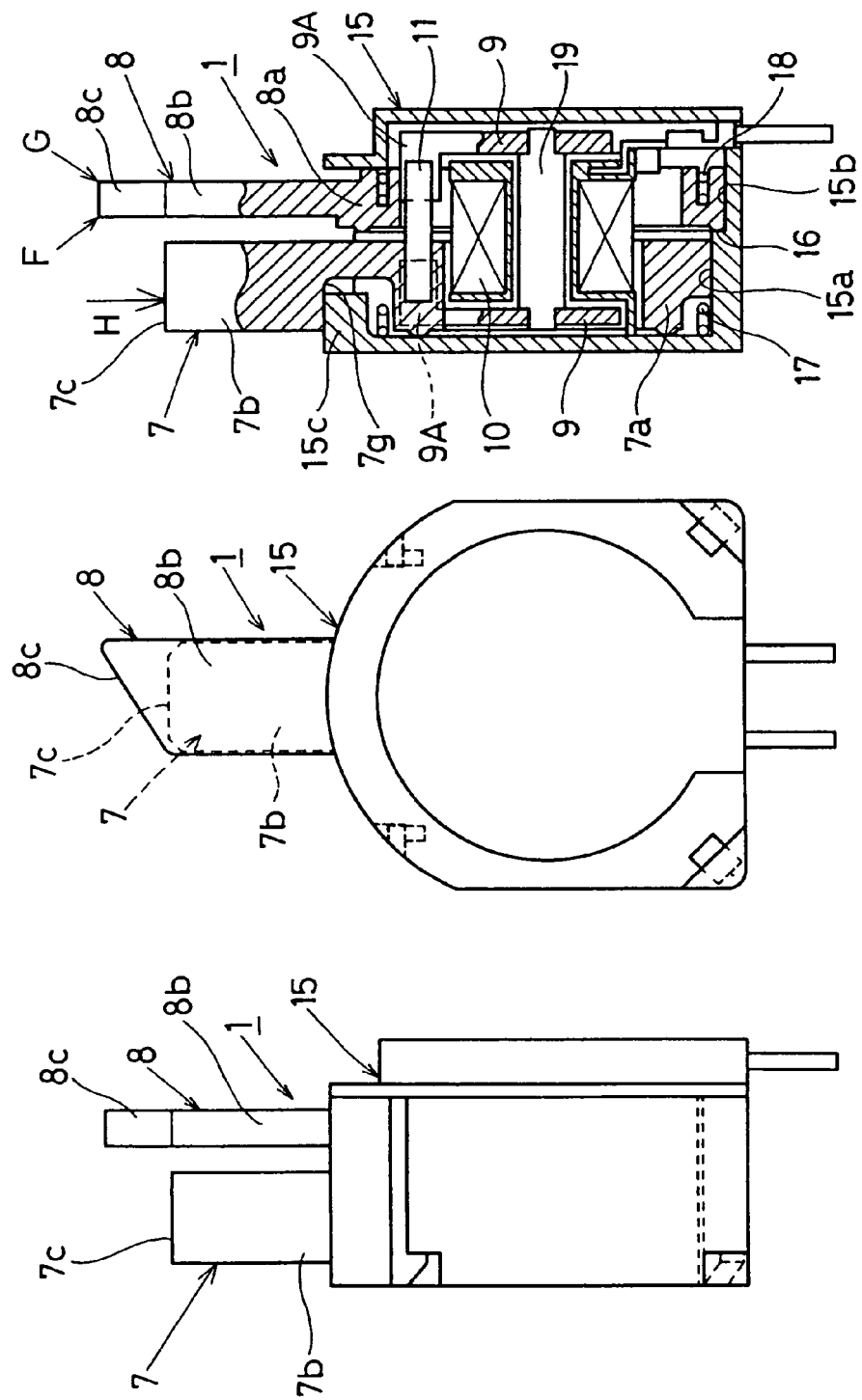

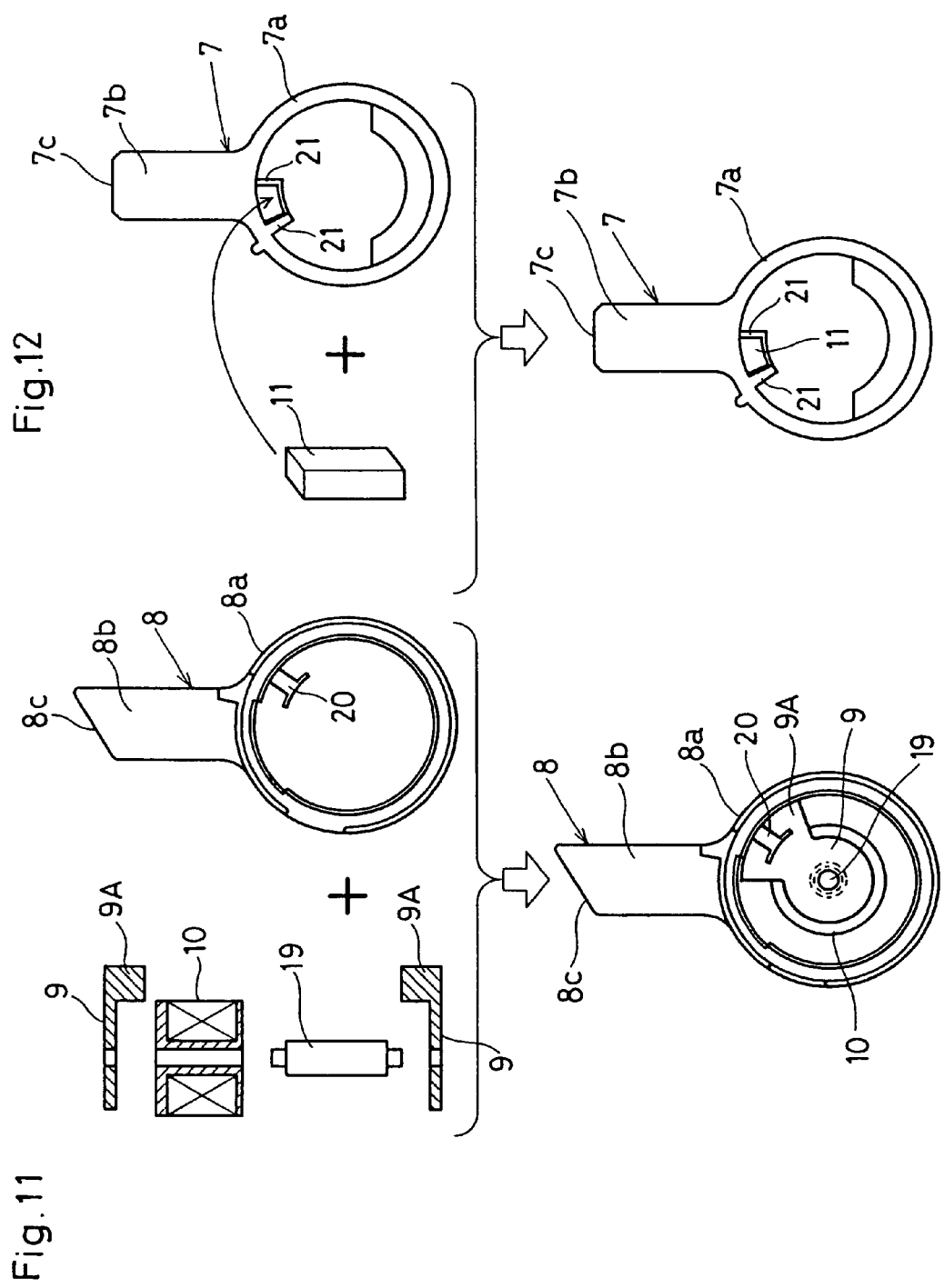

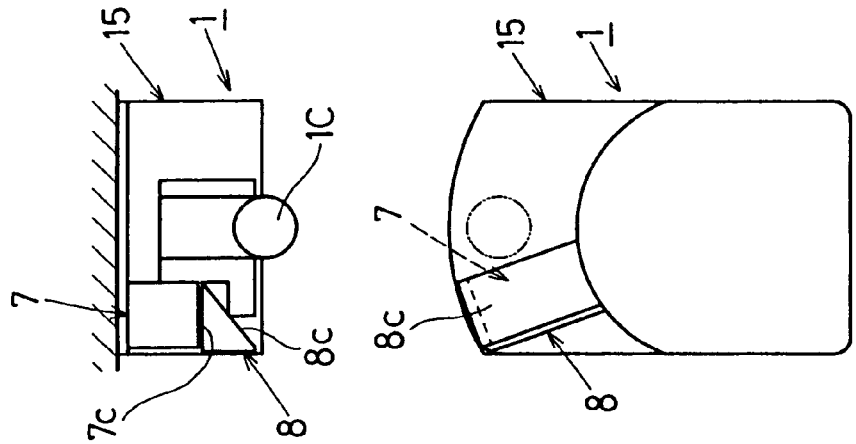
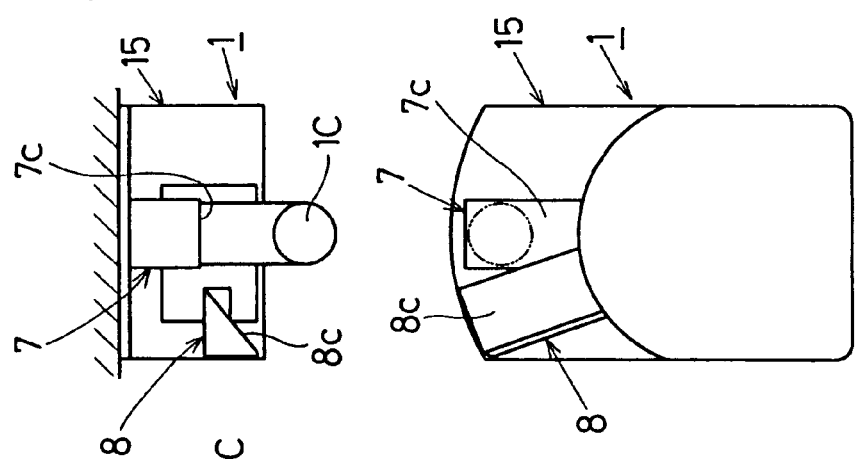
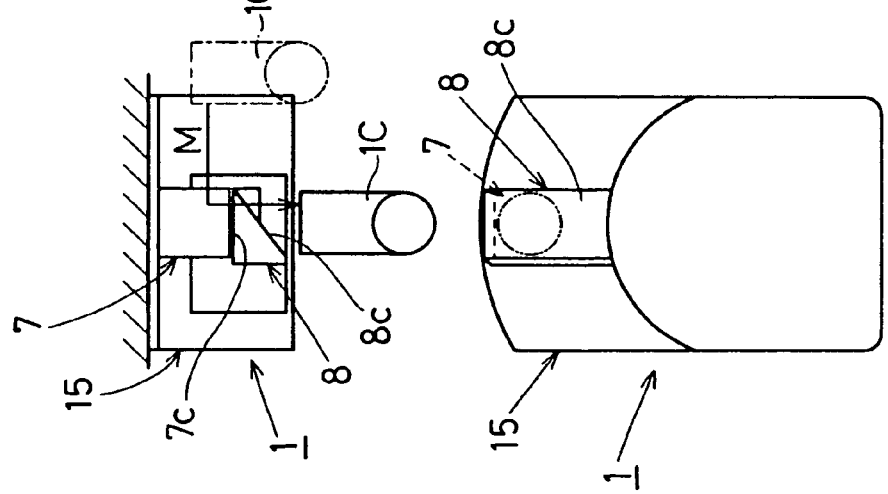

SHIFT LEVER LOCK DEVICE FOR VEHICULAR AUTOMATIC TRANSMISSION

This application is a divisional of U.S. application Ser. No. 11/210,107, filed Aug. 24, 2005 now U.S. Pat. No. 7,213,483. The entire contents of the application are incorporated herein by reference.

BACKGROUND OF THE INVENTION

1. Field of the Invention

The invention relates to a shift lever lock device for vehicular automatic transmission in which a solenoidal coil is energized to produce a magnetic attraction upon unlocking a shift lever.

2. Description of Prior Art

In a shift lever lock device which is mounted on a vehicular automatic transmission, a locking mechanism is provided to effectuate a reverse shift lock and a parking shift lock to insure a safety on navigation by utilizing an electronic solenoid. The reverse shift lock prevents the shift lever from inadvertently moving toward R-range position so as to eliminate a reverse shift shock when the navigating the vehicle at the speed exceeding a predetermined limit.

The parking shift lock prevents the shift lever from inadvertently moving toward D-range position from P-range position once a vehicle is parked with the shift lever located in P-range position.

Upon actuating an ignition key, applying a foot brake permits to release the shift lever so as to render the shift lever operable toward D-range position from P-range position, thus preventing the vehicle from abruptly moving forward due to the inadvertent shifting operation toward D-range position.

Upon releasing the shift lever from the locked position, laterally operating the shift lever makes it operable for a gate type or column type shift lever. For a release button type shift lever, pushing a release button on a knob of the shift lever permits it operable. Upon operating the shift lever to P-range position at the time of parking the vehicle, the shifting operation makes a locker pin move to the locked position so as to render the release button inoperable. Applying the foot brake energizes the electronic solenoid to move the locker pin to an unlocked position from the locked position so as to render the release button operable.

By way of illustration, Japanese Laid-open Patent Application No. 2002-362179 discloses a shift lever device for vehicular automatic transmission. The shift lever device has a rotary shaft to which a follower and a stopper are rockably attached. A metallic plate is placed to stick to a magnet metal with the shift lever stayed in the locked position.

Upon unlocking the shift lever, the metallic plate rotationally moves in the predetermined direction with the metallic plate stuck to the magnet metal. This apparently prevents the metallic plate from hitting against the magnet metal with no operational noise induced since the metallic plate does not encounter the magnet metal when it rotationally moves in the predetermined direction.

However, the magnet metal is mounted on the middle of the follower, thus making the follower lengthened in its axial direction so as to occupy a larger space, which deters the device from providing a space-saving structure with it. The magnet metal adds its weight to the follower so as to make it difficult to provide a smooth and quick rotary movement with the follower when the follower rotationally moves in the predetermined direction.

Since the magnet metal rotationally moves in unison with the follower, electric lead wires extended from the magnet metal to a power source is subjected to repetitive deformation due to an exterior force appeared when the magnet metal moves.

The repetitive deformation subjected to electric lead wires may give the lead wires fatigues resulting them in disconnection at the worst case. A reactionary force appeared when the electric lead wires deform, further deters from imparting a smooth and quick rotary movement to the follower when the follower rotationally moves in the predetermined direction.

Therefore, the present invention has been made with the above drawbacks in mind, it is a primary object of the invention to provide a shift lever lock device for vehicular automatic transmission which is capable of making a lock plate and a link plate dimensionally shortened in their axial direction so as to make them advantageous from the space-saving point of view, and enabling both the plates to a smooth and quick rotational movement without inviting operational noise when unlocking a shift lever by energizing a solenoidal coil.

It is a secondary object of the invention to provide a shift lever lock device for vehicular automatic transmission which is capable of making electric lead wires of a solenoidal coil free from disconnection with no fatigues rested on the electric lead wires, and contributing to imparting a smooth and quick rotary movement to a lock plate and a link plate without inviting a reactionary force on the electric lead wires when the lock plate and the link plate rotationally move.

It is a tertiary object of the invention to provide a shift lever lock device for vehicular automatic transmission which is capable of reducing an urging force of an urging member exerting toward a link plate, thus mitigating click noise induced when the link plate returns to an original position.

SUMMARY OF THE INVENTION

According to the invention, there is provided a shift lever lock device for vehicular automatic transmission, a lock plate is rotatably supported around its rotational center, and urged to rotationally move in a predetermined direction by means of a first urging member. A link plate is rotatably supported around its rotational center to move close to the lock plate and move away from the lock plate. The link plate is always urged by a second urging member in the direction which the lock plate is urged by the first urging member. A solenoidal coil is provided at the rotational center of both the lock plate and the link plate so that the solenoidal coil moves the lock plate in unison with the link plate due to a magnetic attraction produced when the solenoidal coil is energized. A first movable core is provided on the link plate, and having a head portion secured by means of a grip portion, and magnetized when the solenoidal coil is energized. A second movable core is provided on the lock plate, and having a paramagnetic nugget secured by means of a pair of support tongues, and forming a magnetic circuit with the first movable core to make the paramagnetic nugget stick to the head portion when the solenoidal coil is energized.

A lock mechanism is provided to engage the first movable core with the second movable core when a shift lever is locked in a locked position, and making the first movable core and the second movable core stick together by means of the magnetic attraction when the solenoidal coil is energized. Then, the lock plate and the link plate rotationally move together from the locked position to an unlocked position against urging forces of the first urging member and the second urging member upon unlocking the shift lever.

With the above structure, upon unlocking the shift lever by energizing the solenoidal coil, the first movable core and the second movable core rotationally move with two cores stuck together at an original position in which the first movable core engages with the second movable core from the outset.

The first movable core and the second movable core stick together from the original position, thus obviating the first movable core from hitting the second movable core to eliminate an operational noise which would otherwise be produced as a hitting noise.

Considering the structure that the solenoidal coil is located on the rotational center of the lock plate and the link plate, this arrangement shortens the two plates dimensionally in their axial direction so as to make them advantageous from the space-saving point of view.

Since the lock plate and the link plate are rotatably movable in relative to the solenoidal coil, this makes it possible to rotationally move these two plates independent of the solenoidal coil, thus enabling the two plates to a smooth and quick rotational movement.

According to other aspect of the invention, an upper end of the link plate has a slope portion and an upper end of said lock plate has a flat portion. A detent pin is provided in the lock mechanism to move in association with an operation of a select button. The detent pin is adapted to slide along the slope portion of the link plate to engage with the flat portion of the lock plate so as to regulate the further movement of the detent pin.

In order to realize the lock mechanism, it is sufficient to provide the slope portion on the link plate and define the flat portion on the lock plate, thus making an entire structure simple and less costly.

According to other aspect of the invention, the solenoidal coil is located on the rotational center independent of the lock plate and the link plate.

This makes electric lead wires of a solenoidal coil free from disconnection with no fatigues on the electric lead wires which would otherwise be subjected to repetitive deformation due to an exterior force appeared when the magnet moves. This further contributes to imparting a smooth and quick rotary movement to the lock plate and the link plate without inviting a reactionary force on the electric lead wires when the lock plate and the link plate rotationally move.

With no reactionary force on the electric lead wires, it is possible to reduce an urging force of an urging member by an equivalent of the reactionary force, thus mitigating click noise induced when the link plate returns to the original position by means the urging force of the urging member.

According to other aspect of the invention, the lock plate and said link plate each comprise an upper leg portion and a lower cylindrical portion. The lower cylindrical portion is rotatably accommodated into a casing with the upper leg portion located outside the casing. The casing has a stepped border portion between the lock plate and the link plate so that an outer circumferential portion of the lower cylindrical portion of the link plate rotatably slides along the stepped border portion when the link plate rotationally moves the lower cylindrical portion within the casing.

Even if the link plate is subjected to an eccentric load slantwisely against the lock plate for some unknown reasons at the time of locking the shift lever, the link plate engages its lower cylindrical portion with the stepped border portion of the casing. This obviates the rotational movement of the link plate from transmitting to the lock plate, thus saving the lock plate inadvertently from moving in unison with the link plate.

According to other aspect of the invention, either one of an outer circumferential portion of the casing or the upper leg portion of the lock plate has a notched portion, and the other has a prong portion which slides into the notched portion so as to receive an operational load transmitted from the lock plate when the lock plate rotationally moves in a predetermined direction.

Even if a larger downward load is applied to the upper leg portion of the lock plate at the time of locking the shift lever, it is possible for the casing to bear the downward load imposed on the outer circumferential portion of the casing with the prong portion slid into the notched portion. This mitigates the load applied to the lower cylindrical portion, thus preventing the lower cylindrical portion from unfavorably deformed so as to maintain a smooth rotational movement of the lock plate. As a result, it comes possible to cope with the downward load with a thickness-reduced and lightweight lock plate so as to save the cost used for materials.

BRIEF DESCRIPTION OF THE DRAWINGS

A preferred form of the present invention is illustrated in the accompanying drawings in which:

FIGS. 2, 3 and 4 are explanatory views indicating how the shift lock lever device works;

FIG. 8 is a side elevational view of the shift lock lever according to a third embodiment of the invention;

FIG. 9 is a plan view of the shift lock lever;

FIG. 10 is a longitudinal cross sectional view of the shift lock lever;

FIGS. 11 and 12 are explanatory views indicating how the link plate and the lock plate are assembled;

FIGS. 16, 17 and 18 are explanatory views indicating how the shift lock lever device works according to a fourth embodiment of the invention.

DETAILED DESCRIPTION OF THE
PREFERRED EMBODIMENTS OF THE
INVENTION

Figure 1:
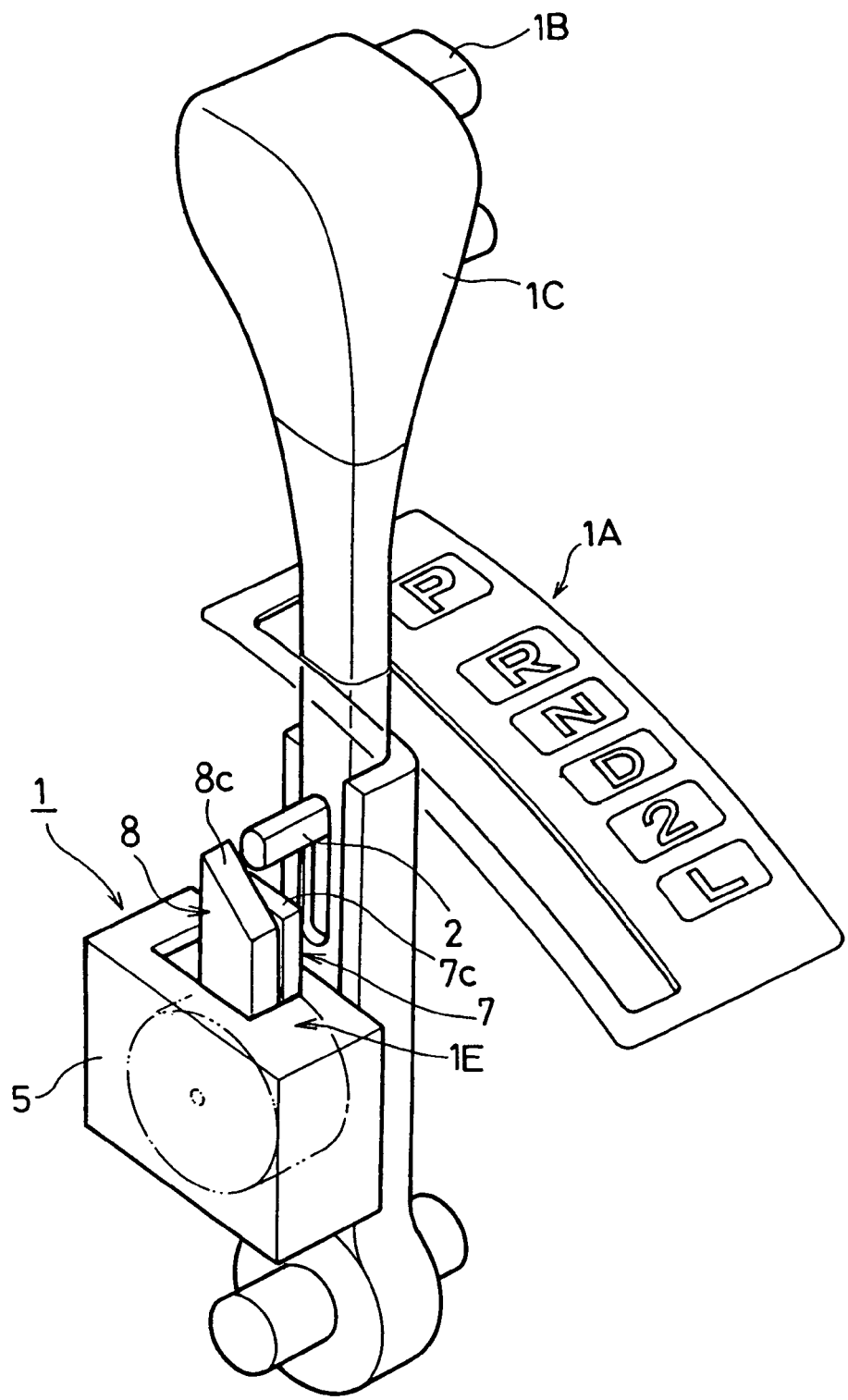
FIG. 1 is perspective view of a shift lever lock device shown with a shift lever, but a detent plate is omitted according to a first embodiment of the invention.
Figure 6:
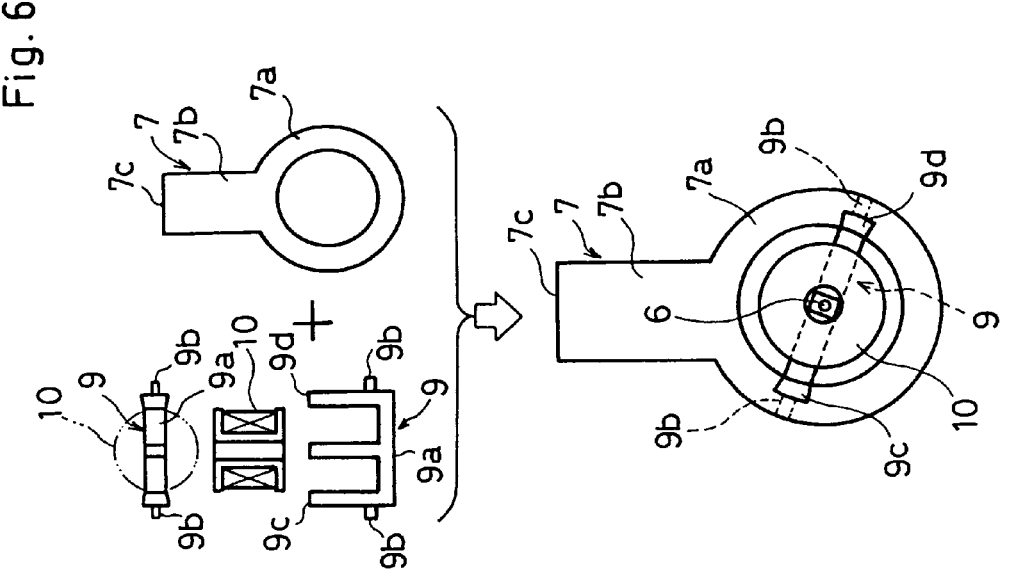
FIGS. 5 and 6 are explanatory views indicating how a link plate and a lock plate are assembled.

Referring to FIGS. 1 and 6 which show a shift lever lock device 1 for vehicular automatic transmission according to a first embodiment of the invention, an operational shift portion 1A is provided in the vehicular automatic transmission as shown in FIG. 1. In the shift lever lock device 1, a lock mechanism portion 1E is provided within a casing 5. The shift lever lock device 1 may be of any type regardless of whether it is of straight-gate type or column-gate type one.

The operational shift portion 1A has a shift lever 1C, an upper end of which has a select button 1B to be operated toward P-range position (parking position), R-range position, N-range position, D-range position, 2-position and L-range position.

As shown in FIG. 2, the shift lever 1C is in the P-range position, and a decent pin 2 is adapted to slide along a detent groove 4 provided on a detent plate 3 which is omitted in FIG. 1. The detent pin 2 axially moves along the shaft lever 1C in association with the select button 1B being operated.

The detent pin 2 looks down a rotational center 6 provided on a central portion of the casing 5 so that a lock plate 7 and a link plate 8 rotationally move around the rotational center 6. The plates 7, 8 are formed by a synthetic material to be generally a boot-like configuration. Within the casing 5, the lock plate 7 has a lower cylindrical portion 7a, and the link plate 8 has a lower cylindrical portion 8a. The lower cylindrical portions 7a, 8a are arranged at the rotational center 6 in a spaced and opposed relationship each other, and the former is adapted to rotationally move in relative to the latter around the rotational center 6.

Figure 5:
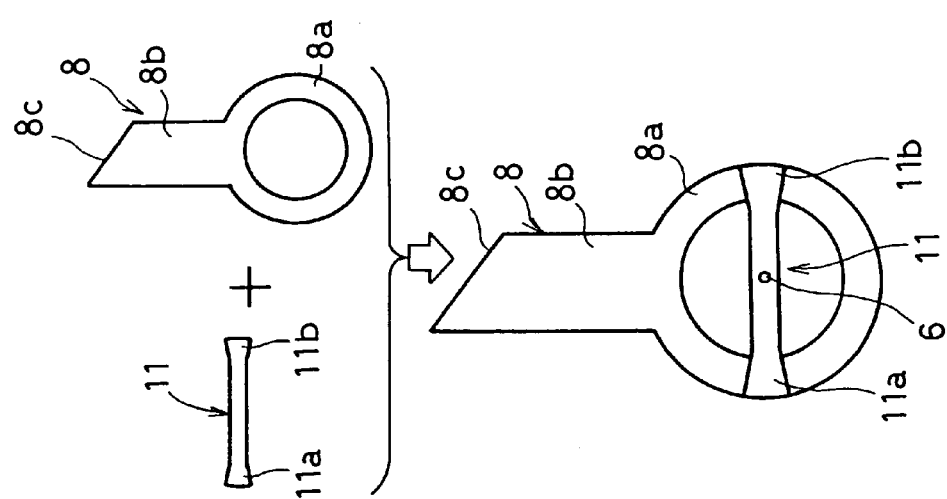

Across the lower cylindrical portion 7a of the lock plate 7, a first movable core 9 provided along its diametrical direction as shown in FIG. 6. The first movable core 9 is made from a paramagnetic substance such as ferro-alloy, stainless steel, mild steel or the like. Across the lower cylindrical portion 8a of the link plate 8, a second movable core 11 provided along its diametrical direction as shown in FIG. 5. The second movable core 11 is made from the paramagnetic substance identical to the first movable cone 9.

The first movable core 9 has a support portion 9a formed into an E-shaped configuration, and loosely fit into a solenoidal coil 10 so that the support portion 9a can rotationally move around the solenoidal coil 10 as shown in FIG. 6. Both ends of the support portion 9a have a lateral arm 9b which is fastened to the lower cylindrical portion 7a of the lock plate 7 when the solenoidal coil 10 is concentrically placed at the rotational center 6 within the casing 5.

The first movable core 9 and the second movable core 11 are arranged generally in a parallel relationship each other with the solenoidal coil 10 interposed therebetween. Elevational sides of the first movable core 9 has reed portions 9c, 9d which in turn engage with bulged portion 11a, 11b provided with both ends of the second movable core 11.

When the solenoidal coil 10 is energized, a magnetic circuit is formed with the first movable core 9 and the second movable core 11 so as to establish a magnetic attraction which makes the reed portions 9c, 9d of the first movable core 9 stick to the bulged portions 11a, 11b of the second movable core 11 so as to connect the first movable core 9 in integral with the second movable core 11. It is to be noted that the solenoidal coil 10 may be fastened to an inner wall (stationary member) of the casing 5 without suspending freely in the casing 5.

When the lock plate 7 and the link plate 8 are not in use as shown in FIG. 2, the two plates 7, 8 make their upper leg portions 7b, 8b locate outside the casing 5, and vertically align them each other. A top end surface of the upper leg portion 7b has a flat portion 7c, and a top end surface of the upper leg portion 8b has a slope portion 8c. In this situation, the first movable core 9 and the second movable core 11 are located in a skew parallel relationship so as to form an angle (θ) at their intersection therebetween.

The lock plate 7 is always urged by a first contractile helical spring 12 in the clockwise direction as shown at an arrow (A) in FIG. 2. The link plate 8 is also urged by a second contractile helical spring 13 in the same direction in which the lock plate 7 is urged by the first contractile helical spring 12.

It is to be noted that the reed portions 9c, 9d of the first movable core 9 may be provided in integral with the lock plate 7 by means of a mold formation or an insert mold formation, and the bulged portions 11a, 11b of the second movable core 11 may be provided in integral with the link plate 8 by the same method.

With the structure thus far described, the solenoidal coil 10 remains deenergized, if a foot brake (not shown) is left unapplied with the shift lever 1C stayed in the P-range position. Depressing the select button 1B permits the detent pin 2 to move downward along the shift lever 1C. Then, the detent pin 2 encounters the slope portion 8c of the link plate 8 and slide therealong so as to rotationally move the link plate 8 in the direction opposite to the arrow (A) against the urging force of the second contractile helical spring 13 as shown in FIG. 3. The link plate 8 thus rotationally moved forms an angle (θ) against the lock plate 7, thereby permitting the detent pin 2 to engage with the flat portion 7c of the lock plate 7 in a locked position.

In the locked position, the lock plate 7 is restricted at its rotational movement due to the reason that the lock plate 7 is rotationally urged by the first contractile helical spring 12 to engage its upper leg portion 7b with an open-end periphery of the casing 5. For this reason, the detent pin 2 is confined to the flat portion 7c, and having no way to escape through the detent groove 4 beyond the flat portion 7c however often the select button 1B is depressed upon trying to push down the detent pin 2.

This means that unless the foot brake is applied, the solenoidal coil 10 remains deenergized, and thus keeping the shift lever 1C in the P-range position to lock the shift lever 1C. This renders the shift lever 1C inoperable toward any other range position however often the shift lever 1C is operated.

On the other hand, applying the foot brake energizes the solenoidal coil 10 to form the magnetic circuit with the first movable core 9 and the second movable core 11. The energized solenoidal coil 10 establishes the magnetic attraction to make the reed portions 9c, 9d of the first movable core 9 stick to the bulged portions 11a, 11b of the second movable core 11 so as to connect the first movable core 9 in unison with the second movable core 11.

Then, the depressing the select button 1B permits the detent pin 2 to move downward along the shift lever 1C. The detent pin 2 encounters the slope portion 8c of the link plate 8 and slide therealong so as to rotationally move the link plate 8 in the direction opposite to the arrow (A) against the urging force of the second contractile helical spring 13.

In this situation, the lock plate 7 rotationally moves in unison with the link plate 8 in the direction opposite to the arrow (A) against the urging force of the first contractile helical spring 12 as shown in FIG. 4. The rotational movement of the lock plate 7 makes the flat portion 7c move away from the detent pin 2 to place the lock plate 7 in an unlocked position.

The unlocked position sets the detent pin 2 to release free from the flat portion 7c, thus permitting the detent pin 2 to pass through the detent groove 4 beyond the flat portion 7c, thus allowing the shift lever 1C to move from the P-range position toward any other range position when the shift lever 1C is operated.

In association with the shift lever 1C being operated toward the other range position, the solenoidal coil 10 is deenergized to extinguish the magnetic attraction working through the first movable core 9 and the second movable core 11. Then, the lock plate 7 and the link plate 8 rotationally move in the direction of the arrow (A) by the urging forces of the first and second contractile helical springs 12, 13. The two plates 7, 8 returns to the original position in which the reed portions 9c, 9d of the first movable core 9 engage with the respective bulged portions 11a, 11b of the second movable core 11.

Upon moving the shift lever 1C from the other range position to the P-range position while parking the vehicle, the shift lever 1C permits the detent pin 2 (refer to phantom lines in FIG. 2) to push an elevational side 7d of the lock plate 7 and an elevational side 8d of the link plate 8 to rotationally move the two plates 7, 8 in the direction opposite to the arrow (A) against the urging forces of the contractile helical springs 12, 13. This makes it possible to pass the detent pin 2 through the detent groove 4 upward so as to confine the detent pin 2 in the locked position as shown at an arrow (C) in FIG. 2.

As described above, energizing the solenoidal coil 10 forms the magnetic circuit between the first movable core 9 and the second movable care 11 to rotationally move the two plates 7, 8 concurrently in the direction opposite to the arrow (A) upon unlocking the shift lever 1C.

In this instance, the first movable core 9 and the second movable core 11 rotationally move with two cores 9, 11 stuck together from the original position in which the first movable core 9 engages with the second movable core 11.

The first movable core 9 and the second movable core 11 stick together at the original position, thus obviating the first movable core 9 from hitting the second movable core 11 to eliminate an operational noise which would otherwise be produced as a hitting noise.

Considering that the solenoidal coil 10 is located on the rotational center 6 of the lock plate 7 and the link plate 8, this shortens the lock plate 7 and the link plate 8 dimensionally in their axial direction so as to make them advantageous from the space-saving point of view.

Since the lock plate 7 and the link plate 8 are rotatably provided in relative to the solenoidal coil 10, it becomes possible to rotationally move these two plates 7, 8 independent of the solenoidal coil 10, thus enabling the two plates 7, 8 to a smooth and quick rotational movement.

The solenoidal coil 10 is located on the rotational center 6 independent of the lock plate 7 and the link plate 8. This makes electric lead wires (not shown) of a solenoidal coil 10 free from disconnection with no fatigues on the electric lead wires which would otherwise be subjected to repetitive deformation due to an exterior force appeared when the solenoidal coil rotationally moves.

This further contributes to imparting a smooth and quick rotational movement to the lock plate 7 and the link plate 8 without inviting a reactionary force on the electric lead wires when the lock plate 7 and the link plate 8 rotationally move.

With no reactionary force on the electric lead wires, it is possible to reduce the urging force of the second contractile helical spring 13 by an equivalent of the reactionary force, thus mitigating click noise induced when the link plate 8 returns to the original position by the urging force of the second contractile helical spring 13.

Figure 7:
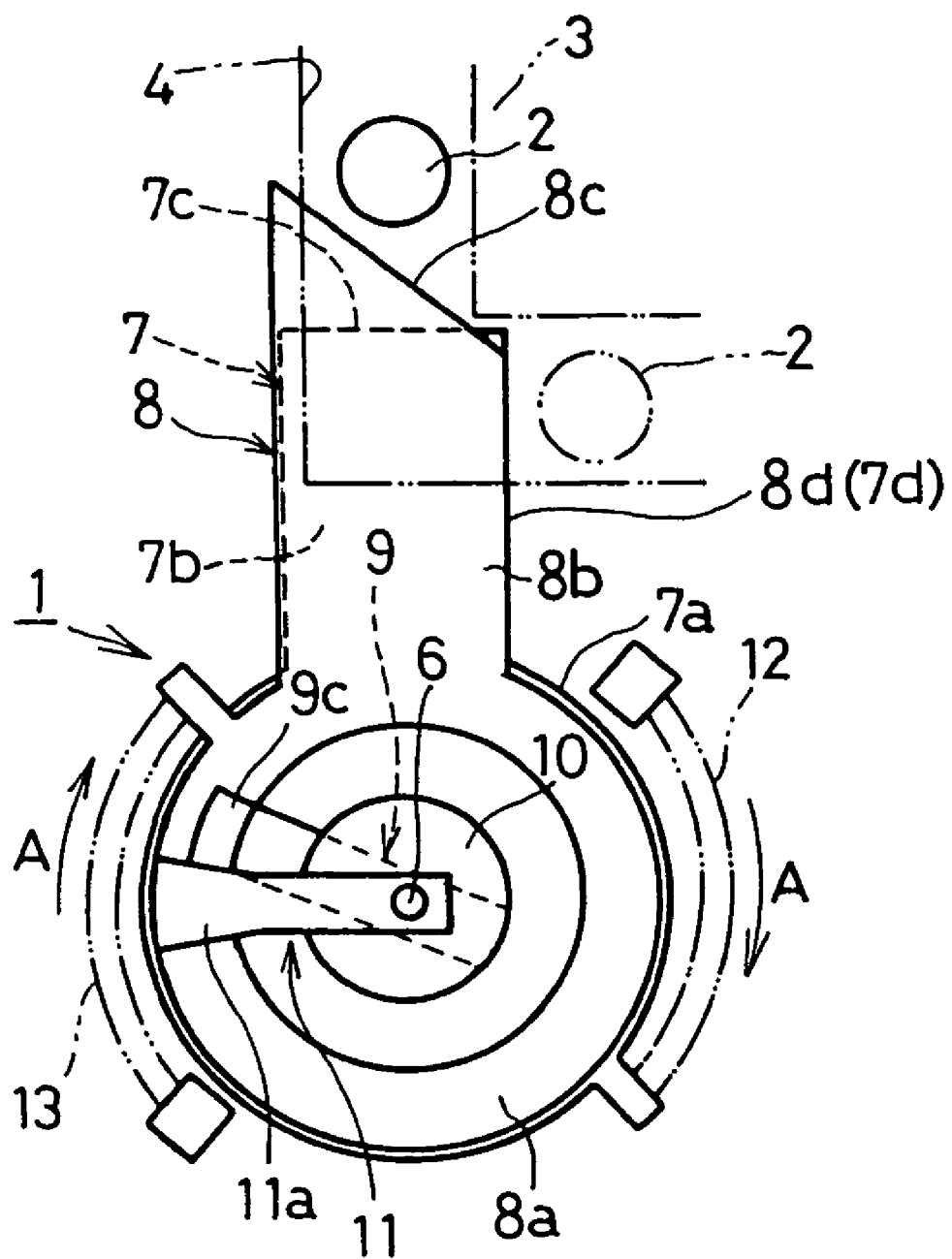
FIG. 7 is an explanatory view indicating how the shift lock lever device works according to a second embodiment of the invention.

FIG. 7 shows a second embodiment of the invention in which the first movable core 11 omits a part of the support portion. 9a with the second movable core 11 substantially halved in length. This contributes to saving the materials to realize the lightweight movable cores 9, 11.

FIGS. 8 through 15 show a third embodiment of the invention in which the lock plate 7 and the link plate 8 locate their lower cylindrical portions 7a, 8a in a casing 15 (refer to FIGS. 8, 9) with the upper leg portions 7b, 8b exposed outside the casing 15 as shown in FIG. 10.

In more tangible terms, the lock plate 7 fits the lower cylindrical portion 7a to rotatably slide into an annular inner wall 15a defined on a left half of the casing 15. The link plate 8 fits the lower cylindrical portion 8a to rotatably slide into an annular inner wall 15b defined on a right half of the casing 15.

Between the casing 15 and the lock plate 7, a first torsional spring 17 is provided as a first urging member. Between the casing 15 and the link plate 8, a second torsional spring 18 is provided as a second urging member. The annular inner wall 15b is designed to be diametrically larger than the annular inner wall 15a so as to define a stepped border portion 16 therebetween. The stepped border portion 15 separates the annular inner wall 15a from the annular inner wall 15b to slidably receive an outer circumferential portion of the lower cylindrical portion 8a when the link plate 8 rotationally moves.

Even if the link plate 8 is subjected to eccentric loads slantwisely as shown at arrows (F) and (G) in FIG. 10, the link plate 8 brings the outer circumferential portion of the lower cylindrical portion 8a into engagement with the stepped border portion 16 so as to avoid the rotational movement of the link plate 8 from inadvertently being transmitted to the lock plate 7.

This prevents the lock plate 7 from rotationally moving in unison with the link plate 8 in association with the link plate 8 being rotationally moved. In so doing, it becomes possible to obviate an unfavorable situation to accidentally lose the normal function of the lock plate 7 upon locking the shift lever 1C.

The casing 15 has an outer circumferential portion defined by an arcuate flange portion 15c to serve as a prong. On the other hand, the lock plate 7 has a side groove 7g into which the flange portion 15c slidably fits to work as a notched portion. Upon rotationally moving the lock plate 7, the lock plate 7 slidably engages an inner wall of the side groove 7g with an outer surface of the flange portion 15c.

Such is the structure that as shown at an arrow (H) in FIG. 10, the flange portion 15c partly receives the download force applied to the flat portion 7c of the lock plate 7 when the lock plate 7 is depressed at its flat portion 7C with the shift lever 1C stayed in the locked position.

This mitigates the load transmitted to the lower cylindrical portion 7a based on the download force applied to the link portion 7 so as not to inadvertently deform the lower cylindrical portion 7a. The load thus mitigated enables the lock plate 7 to maintain a smooth rotational movement, thus making it possible to cope with the downward load with a thickness-reduced and lightweight lock plate so as to save the cost used for materials.

In the third embodiment of the invention, the solenoidal coil 10 has a rotational center at a rotary shaft 19 as shown in FIG. 11. Both ends of the rotary shaft 19 have the first movable core 9 formed into a disc-shaped configuration. An outer periphery of the first movable core 9 has a sector-shaped head portion 9A connected to a grip portion 20 which extends from an inner wall of the lower cylindrical portion 8a. In association with the rotational movement of the link plate 8, its rotational movement is transmitted to the first movable core 9 through the grip portion 20 and the head portion 9A to rotate the first movable core 9 about the rotary shaft 19.

In the meanwhile, the lock plate 7 has a pair of support tongues 21 on an inner wall of the lower cylindrical portion 7a as shown in FIG. 12. Between the two support tongues 21, the second movable core 11 is firmly fit as a paramagnetic nugget to usually engage with an elevational side of the head portion 9A as shown in FIG. 13.

With the energization exerted to the solenoidal coil 10, the first movable core 9 forms the magnetic circuit with the second movable core 11 so that the second movable core 11 sticks to the head portion 9A of the first movable core 9 so as to rotationally move the lock plate 7 in unison with the link plate 8.

With the solenoidal coil 10 deenergized to extinguish the magnetic circuit, the second movable core 11 is released from the magnetic attraction exerting toward the first movable core 9 so that the first movable core 9 and the second movable core 11 can rotationally move individually.

Figure 13:
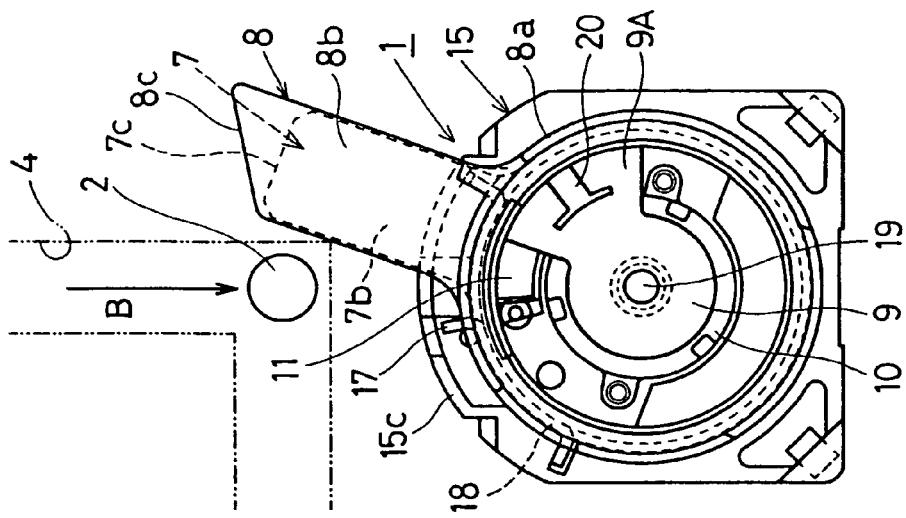
FIGS. 13, 14 and 15 are explanatory views indicating how the shift lock lever device works.
Figure 14:
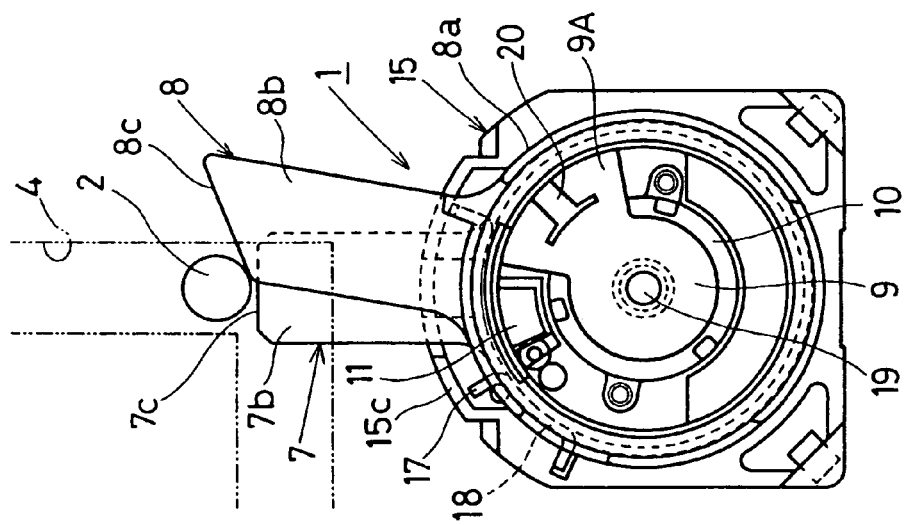
Figure 15:
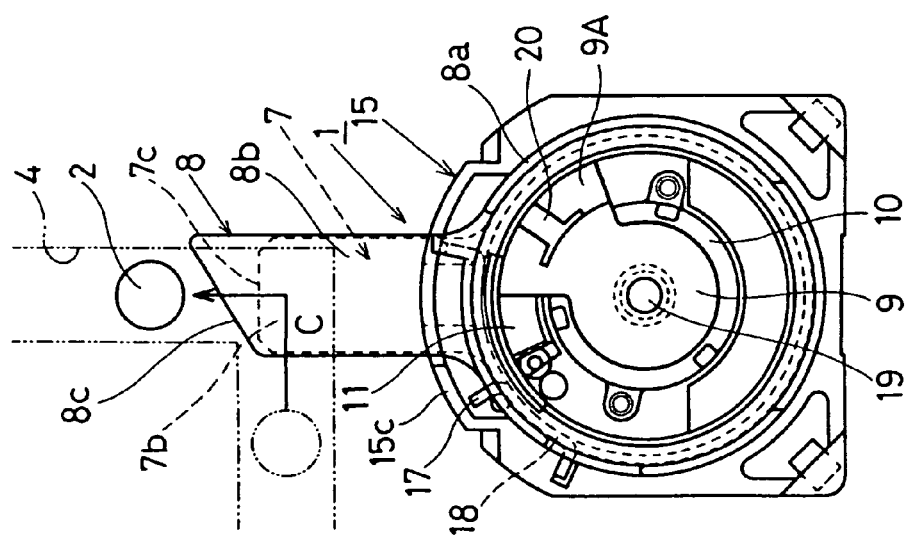

Considering that the second movable core 11 is confined to the magnetic attraction, and then released from the magnetic attraction depending on the energization and the deenergization exerted toward the solenoidal coil 9, it is understood that the shift lever lock device 1 in FIGS. 13-15 works in the same manner as described in the first embodiment of the invention (refer to FIGS. 2-5).

In FIGS. 13-15, it is to be noted that the link plate 8 makes the slope portion 8c reversely incline to that of the first embodiment of the invention, and this makes the lock plate 7 and the link plate 8 rotationally move in the direction opposite to that of the first embodiment of the invention.

FIGS. 16 through 18 show a fourth embodiment of the invention in which the fourth embodiment differs from the third embodiment in that the link plate 8 angularly twists the slope portion 8c approx. 90 degrees in the clockwise direction. In this situation, the link plate 8 makes the slope portion 8c face in front, and the lock plate 7 forms the flat portion 7c on the front elevational side of the lock plate 7.

Upon operating the shift lever 1C in the direction as shown at an arrow (M) in FIG. 16, this operation allows the shift lever 1C to slide along the slope portion 8c of the link plate 8. In the locked position, the shift lever 1C encounters the flat portion 7c of the lock plate 7 as shown in FIG. 17. In the unlocked position, the shift lever 1C slides the slope portion 8c to rotationally move the lock plate 7 in unison with the link plate 8 as shown in FIG. 18.

With this in mind, it is understood that the shift lever lock device 1 in FIGS. 16-18 works in the same manner as described in the first embodiment of the invention (refer to FIGS. 2-5).

In the fourth embodiment of the invention, the link plate 8 inclines the slope portion 8c to such a direction as the shift lever 1C faces axially so as to cope with the direction in which the shift lever 1C is operated. This makes it ready to install the shift lever lock device 1 since the link plate 8 is adjusted the slope portion 8c to face in the direction as the shift lever 1C is operated.

Upon operating the shift lever 1C, the shift lever 1C exerts the operating force against the slope portion 8c and the flat portion 7c in the direction perpendicular to the link plate 8 and the lock plate 7. This obviates the operational force of the shift lever 1C from transmitting to the lower cylindrical portions 8a, 7a so as to cope with the operational force if the force is elevated at its magnitude. From this point of view, it is possible to apply the link plate 8 and the lock plate 7 to not only a column-type shift lever lock device but also a gate-type shift lever lock device.

Modification Forms (a) Instead of the contractile helical springs 12, 13 and the torsional springs 17, 18, a slip ring and a leaf spring may be used.

(b) The link plate 8 and the lock plate 7 may be located in a relationship opposite to the first embodiment of the invention.

(c) Instead of locking the shift lever in the P-range position alone, the shift lock lever device 1 may be used to lock the shift lever 1C in the R-range position or the N-range position. The shift lock lever device 1 may be also used to lock the shift lever 1C concurrently both in the P-range position and the N-range position.

(d) The first movable core 9 and the second movable core 11 may be secured to the lock plate 7 and the link plate 8 by means of a spigot-and-recess joint.

(e) Instead of providing the flange portion 15c on the casing 15 and providing the side groove 7g on the lock plate 7, the flange portion 15c may be formed on the lock plate 7 and the side groove 7g formed on the casing 15.

While there has been described what is at present thought to be preferred embodiments of the invention, it will be understood that modifications may be made therein and it is intended to cover in the appended claims all such modifications which fall within the scope of the invention.

What is claimed is:

1. A shift lever lock device for vehicular automatic transmission comprising:

a lock plate rotatably supported around its rotational center, and urged to rotationally move in a predetermined direction by means of a first urging member;

a link plate rotatably supported around said rotational center to move toward said lock plate and move away from said lock plate, said link plate being always urged by a second urging member in the direction which said lock plate is urged by said first urging member;

a solenoidal coil provided at said rotational center of both said lock plate and said link plate so that said solenoidal coil moves said lock plate in unison with said link plate due to a magnetic attraction produced when said solenoidal coil is energized;

a first movable core provided on said link plate, and having a head portion secured by means of a grip portion, and said first movable core being magnetized when said solenoidal coil is energized;

a second movable core provided on said lock plate, and having a paramagnetic nugget secured by means of a pair of support tongues, and forming a magnetic circuit with said first movable core to make said paramagnetic nugget stick to said head portion when said solenoidal coil is energized;

said lock plate and said link plate being rotatably movable relative to said solenoidal coil; and a lock mechanism provided to engage said first movable core with said second movable core when a shift lever is locked in a locked position, and making said first movable core and said second movable core stick together by means of said magnetic attraction when said solenoidal coil is energized, and rotationally moving said lock plate and said link plate together from said locked position to an unlocked position against urging forces of said first urging member and said second urging member upon unlocking the said shift lever.

2. The shift lever lock device for vehicular automatic transmission according to claim 1, whereby said first movable core is formed into a disc-shaped configuration, and an outer periphery of said first movable core having a sector-shaped head portion connected to said grip portion.

3. The shift lever lock device for vehicular automatic transmission according to claim 1, whereby an upper end of said link plate has a slope portion and an upper end of said lock plate has a flat portion, and a detent pin is provided in said lock mechanism to move in association with an operation of a select button of said shift lever, and said detent pin is adapted to slide along said slope portion of said link plate to engage with said flat portion of said lock plate so as to regulate the further movement of said detent pin.

4. The shift lever lock device for vehicular automatic transmission according to claim 1, whereby said solenoidal coil is located on said rotational center to be rotatably movable independent of said lock plate and said link plate.

5. The shift lever lock device for vehicular automatic transmission according to claim 1, whereby said lock plate and said link plate each comprise an upper leg portion and a lower cylindrical portion, said lower cylindrical portion being rotatably accommodated into a casing with said upper leg portion located outside said casing, said casing having a stepped border portion at an inner wall between said lock plate and said link plate so that an outer circumferential portion of said lower cylindrical portion of said link plate rotatably slides along said stepped border portion when said link plate rotationally moves said lower cylindrical portion within said casing.

6. The shift lever lock device for vehicular automatic transmission according to claim 5, whereby either one of an outer circumferential portion of said casing or said upper leg portion of said lock plate has a notched portion, and the other has a prong portion which slides into said notched portion so as to receive an operational load transmitted from said lock plate when said lock plate rotationally moves in the predetermined direction.

* * * * *